United States Patent

Sloan et al.

[11] Patent Number: 5,813,493
[45] Date of Patent: Sep. 29, 1998

[54] LUBRICATION FLUID DEFLECTOR/BAFFLE FOR A MOTOR VEHICLE AXLE ASSEMBLY

[75] Inventors: David Paul Sloan, Columbia City, Ind.; Paul G. Moreau, Jr., Commerce Township, Mich.

[73] Assignee: Dana Corporation, Toldo, Ohio

[21] Appl. No.: 839,615

[22] Filed: Apr. 15, 1997

[51] Int. Cl.⁶ .................................................... F01M 1/10
[52] U.S. Cl. .......................................... 184/6.12; 184/106
[58] Field of Search .................................. 184/6.12, 106, 184/6.27; 74/606 R, 608

[56] References Cited

U.S. PATENT DOCUMENTS

| | | | |
|---|---|---|---|
| 2,356,953 | 8/1944 | Snow | 184/13 |
| 3,777,848 | 12/1973 | Schaeffer et al. | 184/1 C |
| 4,235,307 | 11/1980 | Browning et al. | 184/6.12 |
| 4,745,816 | 5/1988 | Horiuchi et al. | 74/467 |
| 5,316,106 | 5/1994 | Baedke et al. | 184/6.12 |
| 5,453,181 | 9/1995 | Dahlback et al. | 210/168 |
| 5,505,112 | 4/1996 | Gee | 74/606 R |
| 5,558,591 | 9/1996 | Erickson et al. | 184/6.12 |

Primary Examiner—Rodney H. Bonck
Assistant Examiner—David M. Fenstermacher
Attorney, Agent, or Firm—Oldham & Oldham Co., L.P.A.

[57] ABSTRACT

A lubrication fluid deflector/baffle for a motor vehicle axle assembly which deflects the flow of lubrication fluid inside a motor vehicle differential housing and diverts the lubrication fluid away from the vicinity of an opening or vent in the motor vehicle differential housing to reduce or eliminate "leakage" of lubrication fluid out of the motor vehicle differential housing. The lubrication fluid deflector/baffle for a motor vehicle axle assembly in accordance with the present invention is preferably capable of being mounted in conventional motor vehicle axle assemblies to the bearing cap and is secured in position by a bearing cap bolt.

20 Claims, 2 Drawing Sheets

LUBRICATION FLUID DEFLECTOR/BAFFLE FOR A MOTOR VEHICLE AXLE ASSEMBLY

BACKGROUND AND SUMMARY OF THE INVENTION

The present invention relates generally to a new and novel lubrication fluid deflector/baffle for a motor vehicle axle assembly. More particularly, the present invention relates to a new and novel lubrication fluid deflector/baffle for a motor vehicle axle assembly which is capable of being installed on a motor vehicle axle assembly of conventional design to reduce or eliminate "leakage" of lubrication fluid through an opening or vent normally present in a motor vehicle axle assembly housing of conventional design.

Motor vehicle axle assemblies normally include some type of differential system which allows the wheel on one end of the motor vehicle axle assembly to rotate at a different rotational rate than the wheel on the other end of the motor vehicle axle assembly. Such differentiation between the two (2) wheels on opposing ends of a motor vehicle axle assembly is generally necessary to prevent wheel "skip" or hopping when, for example, the two (2) wheels travel different distances through a turn, or two (2) tires having different diameters are used.

The type of differential system most usually used in such motor vehicle axle assemblies generally includes two (2) side gears which are each rotatably connected with a motor vehicle axle assembly half shaft, in many cases by a splined connection. Positioned intermediate the two (2) side gears are pinion gears, most usually two (2) or four (4), which are rotatably engaged with both side gears. The pinion gears are joined together by a pinion shaft which rotates in conjunction with the side gears when both wheels are rotating at the same rotational rate and no relative rotation of the pinion gears occurs. However, when one wheel rotates at a different rate that the other wheel, for example when the wheels are traveling a different distance through a turn or when tires having different diameters are used, the pinion gears rotate allowing the pinion shaft to rotate at a rotational speed intermediate to the rotational speeds of the two (2) wheels, in the example given, the one traveling the greater distance in a turn or having a smaller diameter tire mounted thereon which would be rotating at a faster rotational rate than the wheel traveling the lesser distance in a turn or having a larger diameter tire mounted thereon.

The motor vehicle differential assembly, including the side gears, the pinion gears and the pinion shaft, is generally enclosed in a motor vehicle differential housing and are bathed in a lubrication fluid to reduce friction and wear and tear on the various rotating internal differential components. When the motor vehicle axle assembly has not been operated for a period of time, the internal differential components and the lubrication fluid are at ambient temperature, which, if the motor vehicle is outside in a cold climate, can be significantly below 0°F. As the motor vehicle differential assembly operates, its internal temperature increases, primarily due to friction between the rotating internal differential components. As the temperature of the motor vehicle differential assembly increases, the differential components, operating fluid and any gas enclosed in the motor vehicle differential housing will tend to expand, thus creating a higher pressure within the motor vehicle differential housing. Conversely, when the temperature of the motor vehicle differential assembly decreases, the differential components, operating fluid and any gas enclosed in the motor vehicle differential housing will tend to contract, thus creating a lower pressure, or a partial vacuum, within the motor vehicle differential housing. Such pressure differentials can create operational and durability problems with the motor vehicle differential housing and the rotating internal differential components therein.

Thus, it is often desirable to include an opening or vent in the motor vehicle differential housing to allow air to enter and exit the interior of the motor vehicle differential housing and equalize the pressure, for example, during temperature variations. While such an opening or vent has been found to be useful in equalizing the pressure within the motor vehicle differential housing, lubrication fluid is often "thrown" in the vicinity of the opening or vent by the rapid rotation of the rotating internal differential components, thus causing lubrication fluid to "leak" from the opening or vent in the motor vehicle differential housing. Such "leakage" of lubrication fluid can, over time, cause a shortage of lubrication fluid in the motor vehicle differential housing which, if it becomes too extreme, can cause operational problems and/or damage to the internal differential components due to insufficient lubrication. In addition, a portion of the lubrication fluid "leaking" out of the motor vehicle differential housing is often retained on the motor vehicle axle assembly and can result in discoloration and an "oily mess" thereon. Perhaps more significantly, some portion of the lubrication fluid "leaking" out of the motor vehicle differential housing will "drip" or fall underneath the motor vehicle onto the driveway and/or garage floor, creating customer dissatisfaction and/or the perception that the motor vehicle axle assembly is of inferior quality.

A preferred embodiment of the present invention is, therefore, directed to a lubrication fluid deflector/baffle for a motor vehicle axle assembly which deflects the flow of lubrication fluid inside a motor vehicle differential assembly and diverts the lubrication fluid away from the vicinity of an opening or vent in the motor vehicle differential housing to reduce or eliminate "leakage" of lubrication fluid out of the opening or vent in the motor vehicle differential housing. The lubrication fluid deflector/baffle for a motor vehicle axle assembly in accordance with the present invention is preferably capable of being mounted in conventional motor vehicle axle assemblies on a bearing cap and is secured in place by a bearing cap bolt.

Other advantages and novel features of the present invention will become apparent in the following detailed description of the invention when considered in conjunction with the accompanying drawings.

DETAILED DESCRIPTION OF THE DRAWINGS

Figure 1:
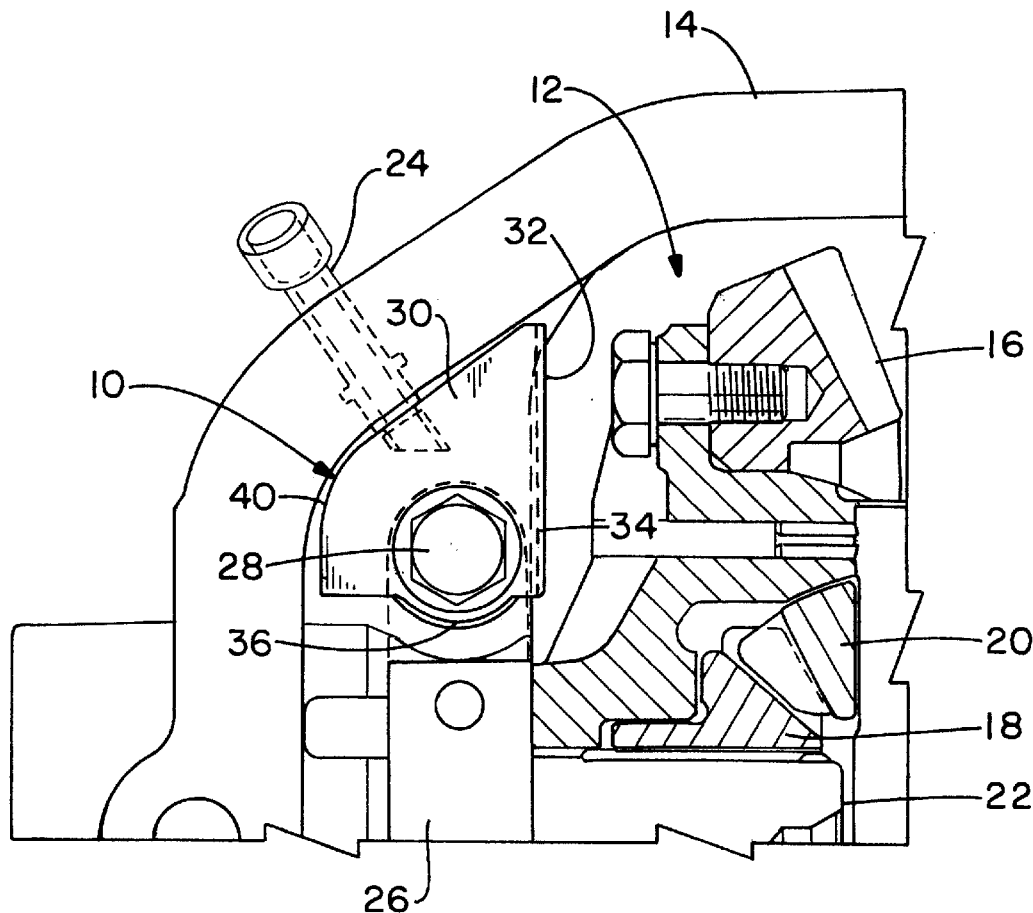
FIG. 1 is a plan front view of a lubrication fluid defector/baffle for a motor vehicle axle assembly in accordance with a preferred embodiment of the present invention mounted in a conventional motor vehicle differential housing, a quadrant of which is shown partly in cross-section and partly in plan view.

In the following detailed description of a preferred embodiment of the present invention, reference is made to the accompanying drawings which, in conjunction with this detailed description, illustrate and describe a preferred embodiment of a lubrication fluid deflector/baffle, generally identified by reference number 10, in accordance with a preferred embodiment of the present invention. Referring now to the drawings, in which like-referenced characters indicate corresponding elements throughout the several views, attention is first directed to FIG. 1, which is a plan front view of a lubrication fluid defector/baffle for a motor vehicle axle assembly in accordance with a preferred embodiment of the present invention mounted in a conventional motor vehicle differential housing, a quadrant of which is shown partly in cross-section and partly in plan view. Motor vehicle differential assembly 12 is preferably of conventional design and includes motor vehicle differential housing 14, which encloses ring gear 16, receiving rotational power from an input shaft (not shown), side gear 18 rotationally coupled to ring gear 16, pinion gear 20 rotationally engaged with side gear 18 and pinion shaft 22 rotatably coupled at one end to pinion gear 20. Pinion shaft 22 rotates along an axis extending along the bottom of FIG. 1 and permits, in conjunction with the rotation of pinion gear 20, relative differentiation between the two (2) motor vehicle axle halves.

Motor vehicle differential housing 14 also includes opening or vent 24 which permits air to enter and exit from the interior of motor vehicle differential housing 14 to equalize the pressure therein. Motor vehicle differential assembly 12 also includes a bearing (not shown) which facilitates relative rotation between the motor vehicle axle half (not shown) and motor vehicle differential housing 14. This bearing is retained in position by bearing cap 26 which, in turn, is secured in position by threaded fasteners, such as threaded bolt 28, at each end thereof. As seen in FIG. 1, lubrication fluid deflector/baffle 10 is secured in position in motor vehicle differential housing 14 on bearing cap 26 by threaded bolt 28 to substantially block or preclude lubrication oil from entering or being "throw" by the rotating internal differential components into the vicinity of opening or vent 24, thus reducing or eliminating the "leakage" of lubrication fluid through opening or vent 24 in motor vehicle differential housing 14.

Figure 3:
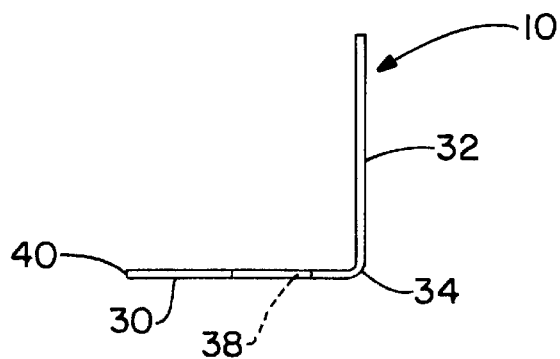
FIG. 3 is a top plan view of the lubrication fluid defector/baffle for a motor vehicle axle assembly in accordance with the preferred embodiment of the present invention shown in FIG. 1.
Figure 2:
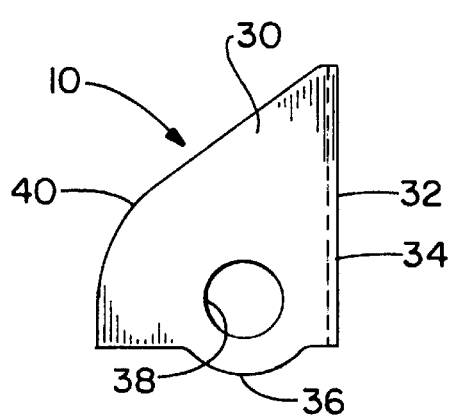
FIG. 2 is a front elevational view of the lubrication fluid deflector/baffle for a motor vehicle axle assembly in accordance with the preferred embodiment of the present invention shown in FIG. 1.
Figure 4:
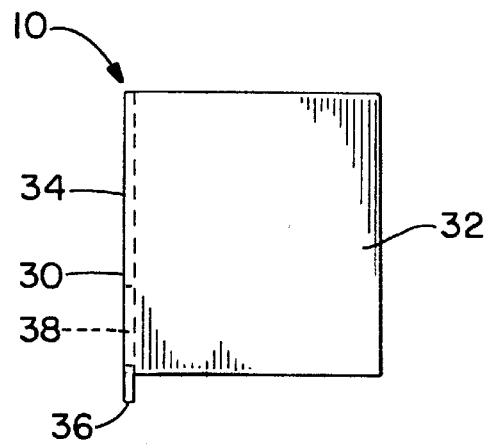
FIG. 4 is a side elevational view of the lubrication fluid defector/baffle for a motor vehicle axle assembly in accordance with the preferred embodiment of the present invention shown in FIG. 1.

Referring now to FIGS. 2 through 4, which illustrate a front elevational view, a top plan view and a side elevational view, respectively, of lubrication fluid deflector/baffle 10, lubrication fluid deflector/baffle 10 generally includes front mounting portion 30 and side lubrication fluid deflector/baffle portion 32. Lubrication fluid deflector/baffle 10 is preferably fabricated from high strength, low alloy, sheet metal steel, although other materials could be used if desired, for example, other metallic materials, such as aluminum, or high temperature polymeric materials. The high strength, sheet metal steel is first punched into the overall "flat" configuration of lubrication fluid deflector/baffle 10 which is then formed through radius 34 to front mounting portion 30 and side lubrication fluid deflector/baffle portion 32, which are preferably positioned at approximately a right angle to each other. Front mounting portion 30 preferably includes radiused downwardly projecting portion 36 and circular opening 38 which is of sufficient size to allow a shaft portion of threaded bolt 28 to pass therethrough, but not so large as to allow a head portion of threaded bolt 28 to pass therethrough. Side lubrication fluid deflector/baffle portion 32 is substantially rectangular in configuration and serves to preclude lubrication fluid which is "thrown" by the rotating internal differential components from entering into the vicinity of motor vehicle differential housing 14 adjacent opening or vent 24.

Figure 5:
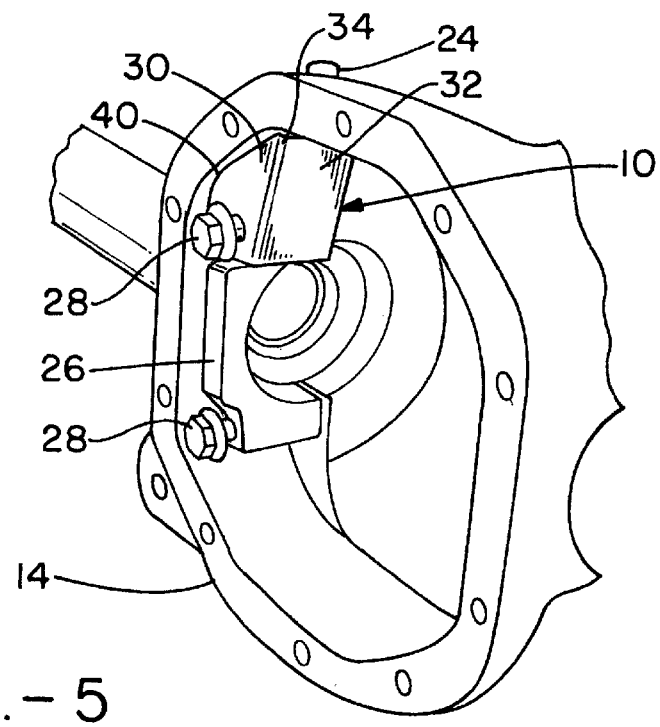
FIG. 5 is a side perspective view of a prototype experimental lubrication fluid defector/baffle for a motor vehicle axle assembly in accordance with the preferred embodiment of the present invention shown in FIG. 1 mounted in a conventional motor vehicle differential housing.
Figure 6:
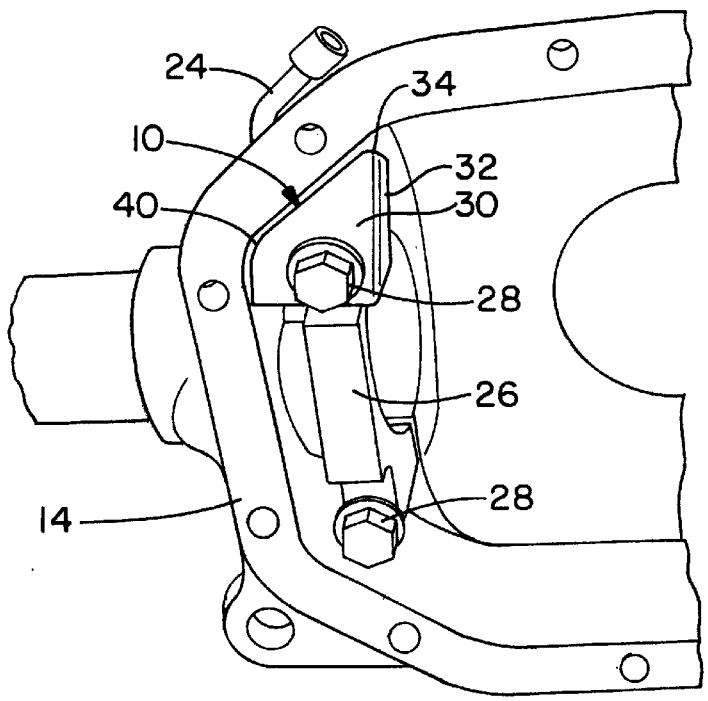
FIG. 6 a front perspective view of a prototype experimental lubrication fluid defector/baffle for a motor vehicle axle assembly in accordance with the preferred embodiment of the present invention shown in FIG. 1 mounted in a conventional motor vehicle differential housing.

Referring now to FIGS. 5 and 6, which illustrate a side perspective view and a front perspective view, respectively, of a prototype experimental lubrication fluid deflector/baffle for a motor vehicle axle assembly mounted in a conventional motor vehicle differential housing, lubrication fluid deflector/baffle 10 is installed on a motor vehicle by safely securing and raising the motor vehicle on a hoist. The motor vehicle axle assembly is then removed from the motor vehicle in accordance with the procedures recommended in the motor vehicle service manual. Next, the motor vehicle differential cover plate screws are removed, the cover plate is removed, the lubricating fluid in motor vehicle differential assembly 12 is drained and discarded and any dirt or debris present in the area of the motor vehicle differential cover plate mounting surface is removed. Threaded bolt 28 securing bearing cap 26 is then removed and lubrication fluid deflector/baffle 10 is positioned with outer surface 40 of lubrication fluid deflector/baffle 10 corresponding to the interior configuration of motor vehicle differential housing 14 and threaded bolt 28 is reinserted through circular opening 38 of lubrication fluid deflector/baffle 10 and torqued to the specified torque level. It may be necessary to hold lubrication fluid deflector/baffle 10 in position while tightening threaded bolt 28 to prevent lubrication fluid deflector/baffle 10 from rotating out of position due to the rotation of threaded bolt 28. New silicone sealant is then placed on the motor vehicle differential cover mounting surface, the motor differential vehicle differential cover is reinstalled and motor differential vehicle differential screws are reinserted and tightened to the proper torque level. At this time, the motor vehicle axle assembly is reinstalled on the motor vehicle and the motor vehicle is removed from the hoist.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A lubrication fluid deflector/baffle adapted for installation in a motor vehicle axle assembly including a motor vehicle differential housing having an opening or vent, a bearing assembly secured in position by a bearing cap and a threaded fastener and lubricating fluid therein, said lubrication fluid deflector/baffle comprising:

a front mounting portion having an opening therein, said front mounting portion capable of being secured on said bearing cap by said threaded fastener; and a side lubrication fluid deflector/baffle portion which precludes lubrication fluid from entering into the vicinity of motor vehicle differential housing adjacent the opening or vent to reduce or eliminate lubrication fluid from "leaking" through said opening or vent.

2. The lubrication fluid deflector/baffle in accordance with claim 1, wherein said front mounting portion includes a circular opening which has a diameter larger than a shaft portion of the threaded fastener, but smaller than a head portion of the threaded fastener.

3. The lubrication fluid deflector/baffle in accordance with claim 2, wherein said front mounting portion includes a radiused downwardly extending portion positioned adjacent said circular opening and said radiused downwardly extending portion includes a radiused portion which is substantially equidistant from and corresponds to a portion of said circular opening.

4. The lubrication fluid deflector/baffle in accordance with claim 3, wherein said front mounting portion includes an outer surface which substantially corresponds to the inner configuration of the motor vehicle differential housing.

5. The lubrication fluid deflector/baffle in accordance with claim 4, wherein said side lubrication fluid deflector/baffle portion is substantially rectangular in configuration.

6. The lubrication fluid deflector/baffle in accordance with claim 5, wherein said lubrication fluid deflector/baffle is fabricated from a metallic material in sheet metal form.

7. The lubrication fluid deflector/baffle in accordance with claim 5, wherein said lubrication fluid deflector/baffle is fabricated from a high strength low allow steel material in sheet metal form.

8. The lubrication fluid deflector/baffle in accordance with claim 1, wherein said front mounting portion includes an outer surface which substantially corresponds to the inner configuration of the motor vehicle differential housing.

9. The lubrication fluid deflector/baffle in accordance with claim 1, wherein said side lubrication fluid deflector/baffle portion is substantially rectangular in configuration.

10. The lubrication fluid deflector/baffle in accordance with claim 1, wherein said lubrication fluid deflector/baffle is fabricated from a metallic material in sheet metal form.

11. A motor vehicle differential assembly for a motor vehicle axle assembly, said motor vehicle differential assembly comprising:

a motor vehicle differential housing enclosing rotating differential components and a lubrication fluid therein, said motor vehicle differential assembly having a bearing assembly to facilitate rotation between said motor vehicle differential housing and a motor vehicle axle, said bearing assembly being secured to said motor vehicle differential housing by a bearing cap and a threaded fastener, and said motor vehicle differential housing further having an opening or vent to permit the entry and exit of air into/from an interior portion of said motor vehicle differential housing; and a lubrication fluid deflector/baffle mounted on said bearing cap under said threaded fastener to preclude entry of lubrication fluid in the vicinity of said opening or vent and reduce or eliminate the "leakage" of lubrication fluid from said opening or vent.

12. The motor vehicle differential assembly in accordance with claim 11, wherein said lubrication fluid deflector/baffle includes a front mounting portion having a circular opening which has a diameter larger than a shaft portion of said threaded fastener, but smaller than a head portion of said threaded fastener.

13. The motor vehicle differential assembly in accordance with claim 12, wherein said front mounting portion includes a radiused downwardly extending portion positioned adjacent said circular opening and said radiused downwardly extending portion includes a radiused portion which is substantially equidistant from and corresponds to a portion of said circular opening.

14. The motor vehicle differential assembly in accordance with claim 13, wherein said front mounting portion includes an outer surface which substantially corresponds to the inner configuration of said motor vehicle differential housing.

15. The motor vehicle differential assembly in accordance with claim 14, wherein said lubrication fluid deflector/baffle further includes a side lubrication fluid deflector/baffle portion which is substantially rectangular in configuration.

16. The motor vehicle differential assembly in accordance with claim 15, wherein said lubrication fluid deflector/baffle is fabricated from a metallic material in sheet metal form.

17. The motor vehicle differential assembly in accordance with claim 15, wherein said lubrication fluid deflector/baffle is fabricated from a high strength low alloy steel material in sheet metal form.

18. The motor vehicle differential assembly in accordance with claim 11, wherein said lubrication fluid deflector/baffle includes a front mounting portion having an outer surface which substantially corresponds to the inner configuration of said motor vehicle differential housing.

19. The motor vehicle differential assembly in accordance with claim 11, wherein said lubrication fluid deflector/baffle includes a side lubrication fluid deflector/baffle portion which is substantially rectangular in configuration.

20. The motor vehicle differential assembly in accordance with claim 11, wherein said lubrication fluid deflector/baffle is fabricated from a metallic material in sheet metal form.

* * * * *